US010236972B2

(12) United States Patent
Sachs et al.

(10) Patent No.: US 10,236,972 B2
(45) Date of Patent: Mar. 19, 2019

(54) METHOD AND APPARATUS FOR PROVIDING EXPANDED INTERFACE OPERATION BETWEEN A PORTABLE COMMUNICATION DEVICE AND AN ACCESSORY

(71) Applicant: MOTOROLA SOLUTIONS, INC, Chicago, IL (US)

(72) Inventors: Daniel Grobe Sachs, Elmhurst, IL (US); Charles B Harmke, Huntley, IL (US); Ellis A Pinder, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 305 days.

(21) Appl. No.: 15/355,081

(22) Filed: Nov. 18, 2016

(65) Prior Publication Data

US 2018/0145745 A1 May 24, 2018

(51) Int. Cl.
| | |
|---|---|
| *G06F 13/00* | (2006.01) |
| *H04B 7/26* | (2006.01) |
| *G06F 13/36* | (2006.01) |
| *G06F 13/40* | (2006.01) |
| *G06F 13/42* | (2006.01) |
| *H04W 4/10* | (2009.01) |

(52) U.S. Cl.
CPC .............. *H04B 7/26* (2013.01); *G06F 13/36* (2013.01); *G06F 13/4068* (2013.01); *G06F 13/4282* (2013.01); *G06F 2213/0042* (2013.01); *H04W 4/10* (2013.01)

(58) Field of Classification Search
CPC ...................................................... G06F 13/36
See application file for complete search history.

(56) References Cited

U.S. PATENT DOCUMENTS

| | | | |
|---|---|---|---|
| 7,395,440 B2 | 7/2008 | Nokkonen | |
| 7,782,218 B2 | 8/2010 | Krempl et al. | |
| 8,577,057 B2 | 11/2013 | Theverapperuma et al. | |
| 8,874,097 B1 | 10/2014 | Warsaw et al. | |
| 8,909,173 B2 * | 12/2014 | Harmke | H04M 1/72547 455/3.06 |
| 8,948,922 B2 | 2/2015 | Schleuthner | |
| 9,363,352 B2 * | 6/2016 | Yew | H04M 1/72527 |
| 9,678,909 B1 * | 6/2017 | Sachs | G06F 13/385 |
| 2005/0075133 A1 | 4/2005 | Pinder et al. | |

(Continued)

FOREIGN PATENT DOCUMENTS

WO        2014043491 A1    9/2014

OTHER PUBLICATIONS

Combined Search and Examination Report Under Sections 17 and 18(3), corresponding patent application No. GB1718316.1 filed Nov. 6, 2017, all pages.

*Primary Examiner* — Tammara R Peyton
(74) *Attorney, Agent, or Firm* — Barbara R. Doutre

(57) ABSTRACT

Improved connectivity between a portable communication device and an accessory is provided through the configuration of a USB type interface. Independent control of a mission-critical subsystem and auxiliary subsystems allow for mission-critical audio and push-to-talk (PTT) to be maintained even in the event of a fault condition within the system. The configurability aspect of the interface allows for additional mission-critical input features to be configured into independent mission-critical subsystems.

13 Claims, 5 Drawing Sheets

(56) References Cited

U.S. PATENT DOCUMENTS

| | | | |
|---|---|---|---|
| 2009/0023483 A1* | 1/2009 | Griffin, Jr. | H04B 1/3822 |
| | | | 455/575.1 |
| 2015/0244406 A1* | 8/2015 | Abdullah | H04B 1/385 |
| | | | 455/90.2 |
| 2015/0256931 A1 | 9/2015 | Ishii | |
| 2016/0088448 A1* | 3/2016 | Han | H04W 4/10 |
| | | | 455/90.2 |
| 2016/0127671 A1 | 5/2016 | Hundal et al. | |

\* cited by examiner

METHOD AND APPARATUS FOR PROVIDING EXPANDED INTERFACE OPERATION BETWEEN A PORTABLE COMMUNICATION DEVICE AND AN ACCESSORY

FIELD OF THE INVENTION

The present invention relates generally to portable communication devices and more particularly to a portable radio device that interfaces via a cable to a portable audio accessory.

BACKGROUND

Portable battery-powered communication devices along with associated accessories are advantageous in many environments, but particularly in public safety environments such as fire rescue, first responder, and mission-critical environments. For example, a battery powered two-way radio may interface to a portable audio accessory, such as a remote speaker microphone (RSM), via a wired cable. In such public safety type environments, the interface used between the portable radio and wired accessory tends to include simple but reliable analog signals and general purpose input/output (GPIO) signals which are difficult to re-use in some cases. Additionally, modern media-intensive devices need higher speed and more flexible interfaces to meet product and user requirements. Since cost and connector size are often concerns, these interface types are in conflict and there is strong motivation to keep connector size small and pin count low. It is highly desirable to take advantage of higher speed interfaces more closely associated with consumer-type architectures. Such an interface is advantageous not only in terms of cost, but also in terms of simplified usage.

While some limited use of consumer universal serial bus (USB) connectivity has been achieved there is still a need to make the interface more robust, particularly for portable public safety type devices. The challenge of such an interface is that it must meet cost, size, and speed requirements while also being able to maintain a level of robustness suitable for mission-critical operation. For example, an audio accessory having (PTT) functionality (from a PTT button) and audio functionality (from a speaker) would need to be minimally impacted by electrostatic discharge (ESD) and contact bounce.

Accordingly, there is a need for method and apparatus providing expanded interface operation between a portable communication device and an accessory.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
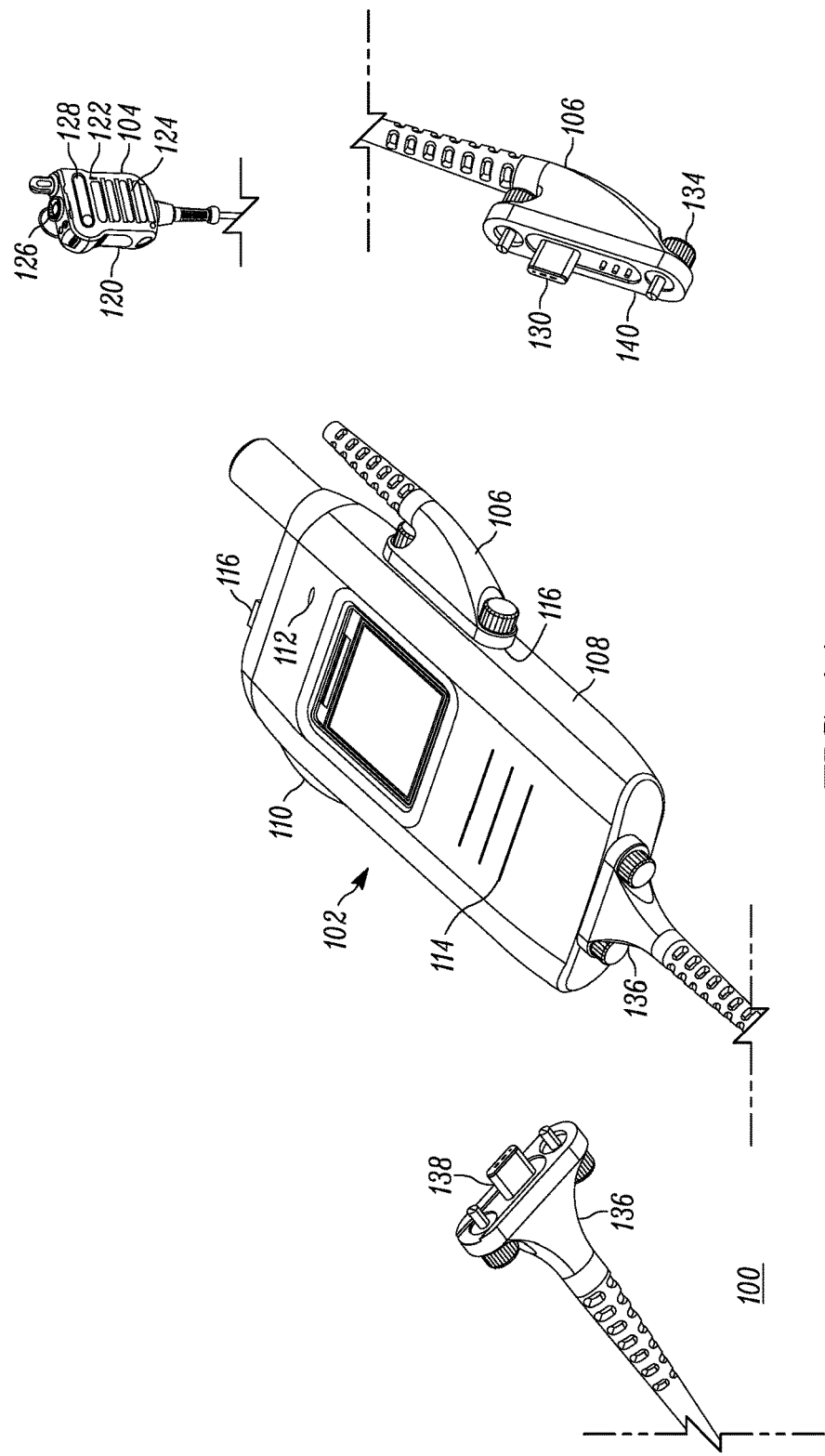
FIG. 1A is portable communication system 100 formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is described herein a method and apparatus for expanded interface operation between a portable communication device and a remote accessory. The expanded interface operation provides for the partitioning between mission-critical accessory operations and non mission-critical operations, also referred to as "auxiliary" accessory operations. The mission-critical operations operate independently from the auxiliary operations, and in some embodiments the mission-critical operations may operate simultaneously to the auxiliary operations. The embodiments provided herein improve reliability of the mission-critical operations between a portable two-way radio and accessory through the use of partitioning. The mission-critical portion of the radio device or accessory will therefore advantageously be substantially immune to an error condition in the auxiliary portion of the radio device or accessory. An error condition includes, but is not limited to, hardware fault, software fault, user-induced fault, and low-power condition.

Mission-critical operations generally include transmit audio, received audio, push-to-talk (PTT) signal input, and emergency signal input. However, this exact set of operations is not strictly required for mission-critical operations. Operations can be added, removed, or substituted from this exemplary mission-critical set. For a given product, the mission-critical operations over the accessory interface are typically the communications and interface control functions that maintain communication and alerts.

While the mission-critical portion of a radio device or accessory is, as its name implies, "critical", the mission-critical portion is not necessarily the most complex. In some embodiments, the exact opposite may be true. For example, a two-way communication device may contain an application processor running a high-level operating system (HLOS) such as Android, and one or more applications. Such embedded systems are extremely complex and error conditions such as crashing or "lock-up" of applications or even the HLOS itself are not uncommon. In such a system, it is actually the HLOS portion that is considered the auxiliary portion of the system, because the reliability of this portion aligns with "non mission-critical". In a preferred embodiment, the mission-critical partition of the system utilizes less-complex software on a separate processor, with such operations running largely independently. Those skilled in the art will recognize that the mission-critical subsystem itself is not completely immune to faults, "crashes", lock-ups, and the like, but rather such faults are substantially less likely to occur due to the aforementioned reduced complexity, extensive testing, typical "closed" nature of the software, and infrequent changes. Accordingly, the partitioning of the present invention is advantageous because it isolates hardware and software systems more prone to fault conditions (i.e. the auxiliary subsystem) from those less prone to fault conditions (i.e. the mission-critical subsystem). In accordance with the embodiments, partitioning extends through the device, through the interface, and through the accessory.

It should also be recognized that there is a need for communication between the subsystems, particularly the processors, on the radio device side. Furthermore, it is likely that certain user interface elements including buttons, switches, knobs, LEDs, and displays may be shared between the two subsystems.

The interface provided by the various embodiments advantageously provides for mission-critical audio connectivity to be transmitted over an expanded interface. The use of low-speed digital, analog and GPIO-style connections provide for a more robust interface that minimizes the impact fault conditions. Fault conditions may include software faults or errors that cause incorrect, unreliable, or cessation of operation. Examples of software fault conditions may include software bugs, stack overflow conditions, to name a few. Faults conditions may additionally include hardware faults or errors that may cause incorrect, unreliable or cessation of operation. Examples of hardware fault conditions may include an electrostatic discharge (ESD) event or an electrical contact bounce event.

The interface provided by the embodiments partitions connectivity between high-speed serial data links and a set of analog audio links and simple digital signals, which provides for fail-safe operation of a mission-critical subsystem. The interface of the various embodiments provides for the actual partitioning of connectivity between independent subsystems on the radio device. The various embodiments provided herein enable an interface providing robust, mission-critical audio connectivity. In the preferred embodiment, the expanded interface is USB-C and may use a standards-compliant USB-Type C connector. However, it is understood that other mechanical interfaces such as pogo-pins and corresponding contacts may also be utilized for even more increased robustness.

FIG. 1A is portable communication system 100 formed and operating in accordance with some embodiments. Portable communication system 100 comprises a portable communication device, such as a portable radio 102, having a wired remote audio accessory 104, such as a remote speaker microphone (RSM) 104, or other remote audio accessory, coupled thereto via an accessory connector 106. For the purposes of this application, the portable radio 102 is shown and described as a handheld battery operated device, however it is to be understood that the portable radio may also be embodied as a mobile vehicular mounted radio having a remote audio accessory, such as a wired remote microphone, coupled thereto via the accessory connector 106 to also take advantage of the expanded interface operation provided by the embodiments described herein.

Referring to FIG. 1A, the portable radio 102 is formed of a housing 108 comprising a push-to-talk (PTT) button 110, a microphone 112, and a speaker 114 for communicating over a two-way radio communication system. Housing 108 further comprises an interface receptacle 116 formed therein for receiving the accessory connector 106 of RSM 104. The RSM 104, typically worn at a user's shoulder such as coupled to a pocket or epaulette, mimics the functionality of the portable radio 102 via RSM PTT button 120, microphone 122 and speaker 124. Some RSMs further comprise emergency button 126 and a display 128. In accordance with the embodiments, a configuration is provided to interface receptacle 116 and the accessory connector 106 to provide expanded interface operation which permits independent operation of a plurality of subsystems. In accordance with the embodiments, the expanded interface configuration provides the ability maintain operation of a mission-critical subsystem even in the event of an internal error condition impacting auxiliary subsystems.

While the accessory connector 106 is shown as a side mounted connector, it is to be understood that the mounting placement on housing 108 can be changed to accommodate for different types of accessories and/or additional accessory connectors, such as accessory connector 136 with plug 138 which can be coupled to a base of the housing 108 of portable radio 102. In accordance with the embodiments, the configuration provided to interface to the accessory connector 136 would similarly provide expanded interface operation to permit independent operation of a plurality of subsystems within the accessory and the radio. For extremely robust applications, connector 106 can be embodied in an all pogo-pin with corresponding mating contacts arrangement, if desired. Similarly connector 136 can make use of an all pogo-pin with corresponding mating contacts arrangement. The management of the expanded interface and configuration of subsystems can thus be adapted to different physical interconnects in accordance with the various embodiments.

A second connector may be utilized, if desired or as deemed necessary, for certain radio applications. For example the second plug 138 may be used for charging and or programming of the portable radio 102. Additionally, second connector 136 can be utilized to interface to another accessory, such as a car kit accessory (not shown), to radio device 102 by allowing PTT and audio connections to a car speaker and microphone. Thus, the second connector 136 can be used to provide an expanded interface for mission-critical operation in place of, or in addition to, the first connector 116. Hence, location of the accessory connector can be adjusted based on function and design product requirements.

In accordance with a preferred embodiment, accessory connector 106 preferably comprises a USB type C plug 130 (USB-C plug 130) insertable into a corresponding jack (not shown) of the portable radio's interface receptacle 116. The accessory connector 106 incorporating USB-C plug 130 is preferably encased in ruggedized mechanics 134 to further protect the interface connections between the two devices for public safety environments. Alternatively, accessory connector 136 can be embodied in pogo-pin with mating interface contact arrangement as discussed previously.

One or more screws 134, or other attachment means, may be used to secure the accessory connector 106 to the housing 108 of portable radio 102. The connector 106 at the accessory side may further comprise RF interface contacts 140, which may be embodied for example such as pogo pins for aligning and making contact with corresponding interface contacts, for example via flush mount contacts (not shown), located within the portable radio's receptacle 116, thereby providing RF connectivity therebetween. Other RF interconnect pin arrangements if needed can also be used.

In accordance with some embodiments, assignment of mission-critical control functions through predetermined ports of the interface 116/106 at the USB-C plug 130 and jack minimizes reliance on secondary microprocessors which may be present in the RSM 104. Minimizing reliance on secondary processors also makes the mission-critical communication paths more resilient to fault conditions.

Mission-critical control functions continue operation of remote audio at RSM 104 via a fast PTT 120 and microphone 122 and speaker 124, even in the event of error conditions occurring within the portable communication system 100. Also, for some applicable devices, operation of an emergency button 126 may further be included as part of mission-critical control functionality. For example a public safety operator of the portable communication system, such as a firefighter operating the radio device and accessory can operate the system with increased reliability knowing that mission-critical functionality will be maintained in the toughest of environments.

Figure 1B:
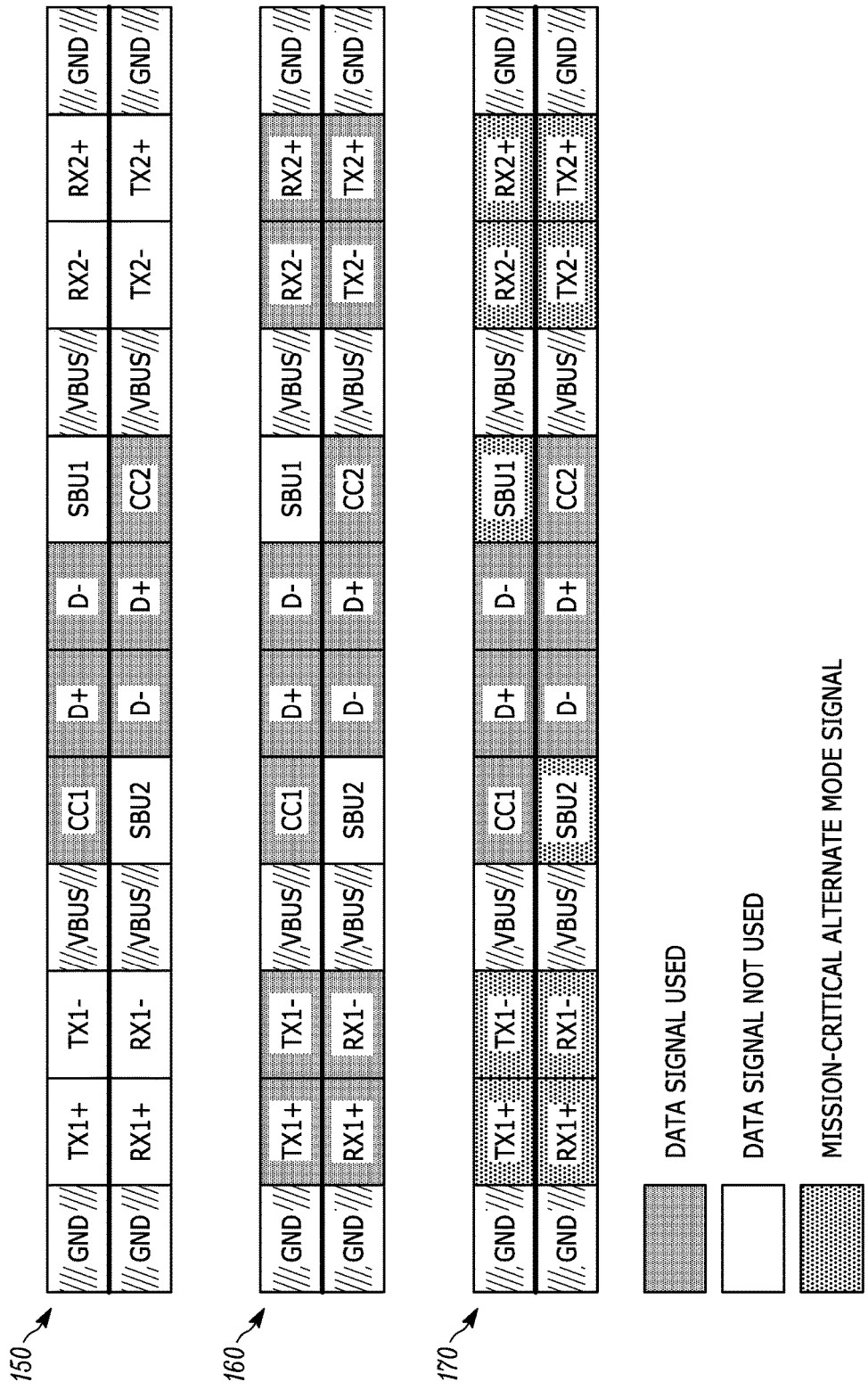
FIG. 1B shows a comparison of a standard USB-C signal assignment to signal assignments associated with various embodiments of the present invention.

FIG. 1B shows a comparison of a standard USB-C signal assignment to signal assignments associated with various embodiments of the invention. In FIG. 1B a gray scale indicates a data signal being used, and a white background indicates that no data signal is being used, and a stippled background indicates a mission-critical alternate mode signal. Ground (GND) and power/(VBUS) designations have been marked with hatching and are understood to always be used as power/Vbus and GND, and as such will not be listed or discussed further. FIG. 1B shows USB Modes 150, 160, and 170 which are examples of instant configurations of the entire USB interface, where each such configuration is mutually exclusive of all other configurations. The USB Mode 150 is a USB high speed mode 150 which is a known mode which does ordinary USB communication at "high speed" as defined by the USB standard. Mode 150 does not make use of the SuperSpeed or sideband signals and does not support an alternate mode. The USB Mode 160 is a SuperSpeed mode 160 which is a known configuration which does ordinary USB communication at "SuperSpeed" as defined by the USB standard. Mode 160 typically does not support alternate mode. The USB alternate mode 170 shows signal designations for a mission-critical alternate mode with USB high speed mode which are shown in accordance with some embodiments of the invention. Modes 150, 160, and 170 are examples of instant configurations of the entire USB interface, where each such configuration is mutually exclusive of all other configurations.

In accordance with some embodiments, the USB alternate mode 170 is configured for mission-critical and auxiliary interface operation as follows: sideband channels SBU1 and SBU2 are operating as GPIO lines providing mission-critical PTT and emergency interfaces, RX differential lines are operating as mission-critical analog audio line interfaces, and additional mission-critical functions overlaid onto the USB PD configuration channel; and the USB alternate mode 170 is further configured for auxiliary subsystem interfaces through digital data bus lines D+, D−. The two Tx differential pairs are not used in the preferred embodiment, although these are available USB-C alternate mode signals. These Tx differential pairs may be used for example, for additional signal lines or for some other mission-critical purpose. In yet another embodiment, USB alternate mode 170 is modified (not shown) to further allow USB SuperSpeed operation by using one set of the TX/RX differential pairs for SuperSpeed operation and the other set of TX/RX differential pairs for alternate mode of operation. It should be recognized that there is some flexibility to the assignment of alternate mode signals and thus a number of varying implementations of the present invention.

In accordance with the embodiments, portable communication system 100 of FIG. 1A may be partitioned into a plurality of independent subsystems between the portable radio 102 and RSM 104 which are controlled via the USB-C interface configured for the mission-critical USB alternate mode 170 shown in FIG. 1B. The USB alternate mode 170 is configured to support a plurality of independent subsystems including at least one mission-critical subsystem and at least one non mission-critical (i.e. auxiliary) subsystem. Exemplary designations for mission-critical controls of the mission-critical subsystem are shown in Table 1 below.

TABLE 1

| Mission-critical subsystem - Accessory Side | |
|---|---|
| FUNCTION | ASSIGNMENT |
| Mission-critical Audio | RX2−, RX2+ |
| Mission-critical Audio | RX1+, RX1− |
| Push-to-talk Button | SBU1 |
| Emergency Button | SBU2 |

In the event of a fault condition the pre-assigned mission-critical control functions will remain functional providing a public safety personnel user with high reliability of connectivity. Thus, the mission-critical mode provides the highest reliability of operation in that control functions are hard-wired to their respective switches and may operate without reliance on a processor in the accessory In accordance with the embodiments, portable radio 102 may provide additional mission-critical operation features beyond PTT and analog audio if desired by partitioning additional inputs into other independent subsystems. For example, additional mission-critical inputs can be controlled by a USB TYPE-C power delivery controller. This portion of the mission-critical subsystem allows for independently run functions of radio 102 which need not rely on a microprocessor, such as RSM LEDs 126 and volume buttons, and other non-processor dependent features. Exemplary designations for these controls of a secondary mission-critical subsystem are shown in Table 2 below.

TABLE 2

| Additional Mission-critical Subsystem - Accessory Side (Shared over USB-PD Control Channel bus): | |
|---|---|
| FUNCTION | ASSIGNMENT |
| LEDs | data messages sent over shared CC bus (CC1 or CC2 pin) |
| OTHER INPUT | data messages sent of shared CC bus (CC1 or CC2 pin) |

These mission-critical controls do not have dedicated lines, but rather use bus messaging over a shared bus: the USB Power Delivery (PD) Control Channel (CC) bus. Those familiar with USB-C and USB-PD will recognize that such messaging travels over the CC signal in the cable, and to/from the CC1 or CC2 pin at each receptacle based on the orientation of the plug, for example the USB-C plug 130 of FIG. 1.

In accordance with the embodiments, portable radio 102 further provides operation partitioned into other independent subsystems, referred to as auxiliary subsystems which operate non mission-critical controls and inputs, such as the RSM display 128. Some control functions of RSM display 128 are controlled by a RSM microprocessor which is connected via the USB alternate mode interface 170 from radio 102 to RSM 104. Communication for such functions operates over the standard USB Bus (D+/D−), typically at high-speed. As this is a typical USB data bus, it should be recognized that this bus may be shared or used by other functions beyond the scope of the present invention.

TABLE 3

Non mission-critical Auxiliary Subsystem - Accessory Side

| FUNCTION | ASSIGNMENT |
| --- | --- |
| DISPLAY | shared data messages over D+/D− bus |
| NON MISSION-CRITICAL INPUT | shared data messages over D+/D− bus |

Additionally, portable radio 102 may comprise its own auxiliary subsystem which is also a non mission-critical subsystem, such as an Android operating system, long term evolution (LTE) system, and/or other operating system for that supports a smartphone option of the radio 102, This smartphone auxiliary subsystem is a non mission-critical subsystem operating on its own processor and interfaces to a non mission-critical subsystem of the RSM 104 via USB alternate mode interface 170, so that RSM 104 can mimic predetermined smartphone features.

Accordingly, communication system 200 provides mission-critical audio, PTT, and emergency which do not rely on an accessory processor along with predetermined buttons of key importance controlled by a USB PD controller. In the preferred embodiment, communication takes place over the USB alternate mode configuration of FIG. 1B using SBU (1, 2), USB-PD C1, C2, and SBU1, SBU2 of the Type C interface.

In accordance with additional embodiments, the auxiliary subsystem utilizes (from a mix of radio and accessory) user interface, displays, cameras, touch controls and other auxiliary functions communicating over USB D+/D− differential pins operating in high speed digital communication modes. It is important that any fault or error conditions or associated recovery that might possibly take place in the user interface subsystem not impact mission-critical audio functions taking place in mission-critical subsystems of the device and accessory, such as the baseband/audio processor. In accordance with the embodiments, loose coupling of the user interface subsystem ensures that any faults in the user interface subsystem are isolated from the mission-critical audio functions provided by the baseband/audio subsystem. The communication system 100 provides both a hard-wired emergency and PTT button. The PTT and Emergency control functions preferably communicate over sideband channels (SBU1 or SBU2) configured as signal lines for direct access between the radio processor and the RSM PTT.

Figure 2:
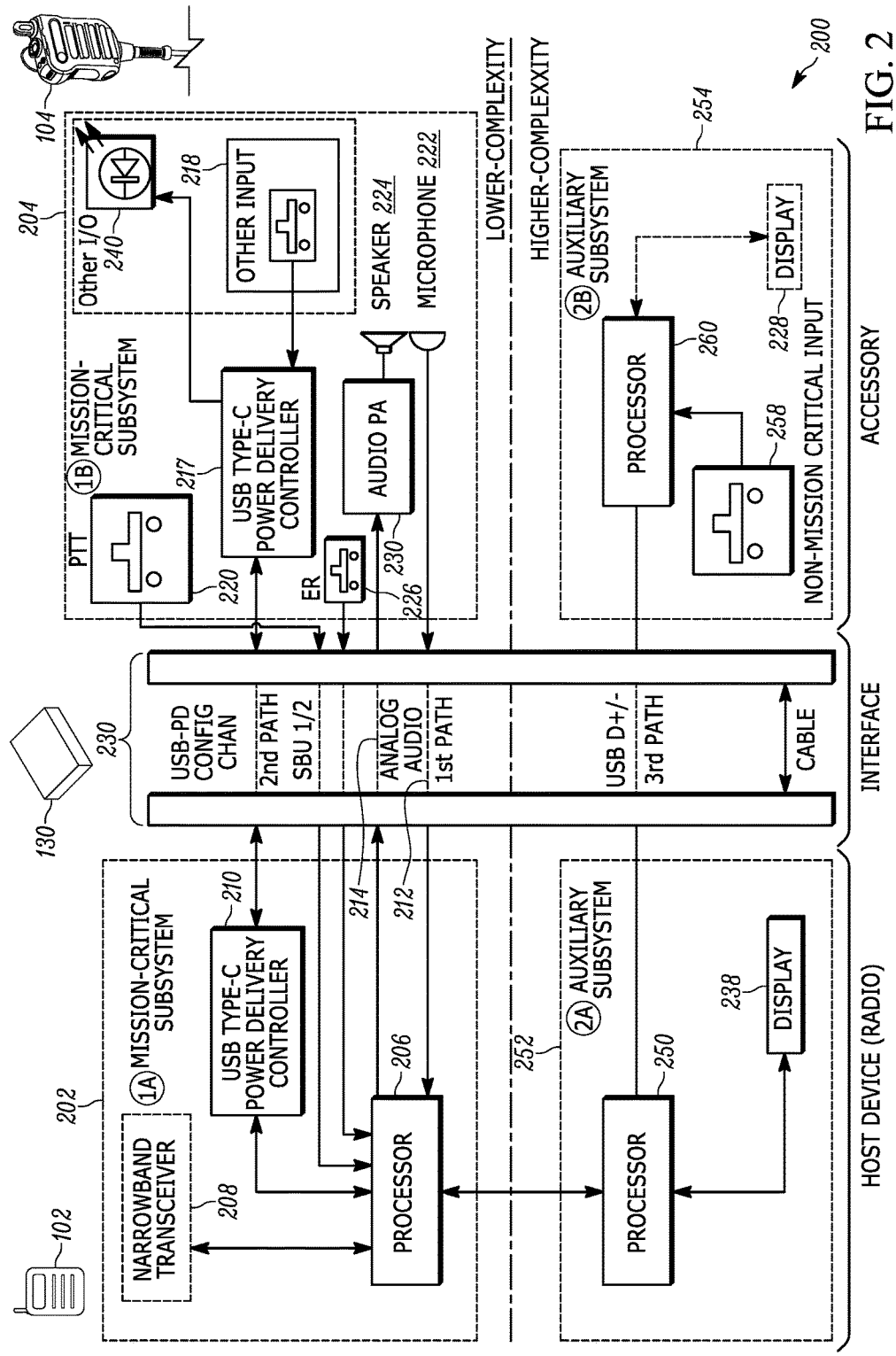
FIG. 2 is a block diagram of a portable communication system including portable radio, USB-C interface and a remote speaker microphone (RSM) formed and operating in accordance with some of the embodiments.
Figure 3:
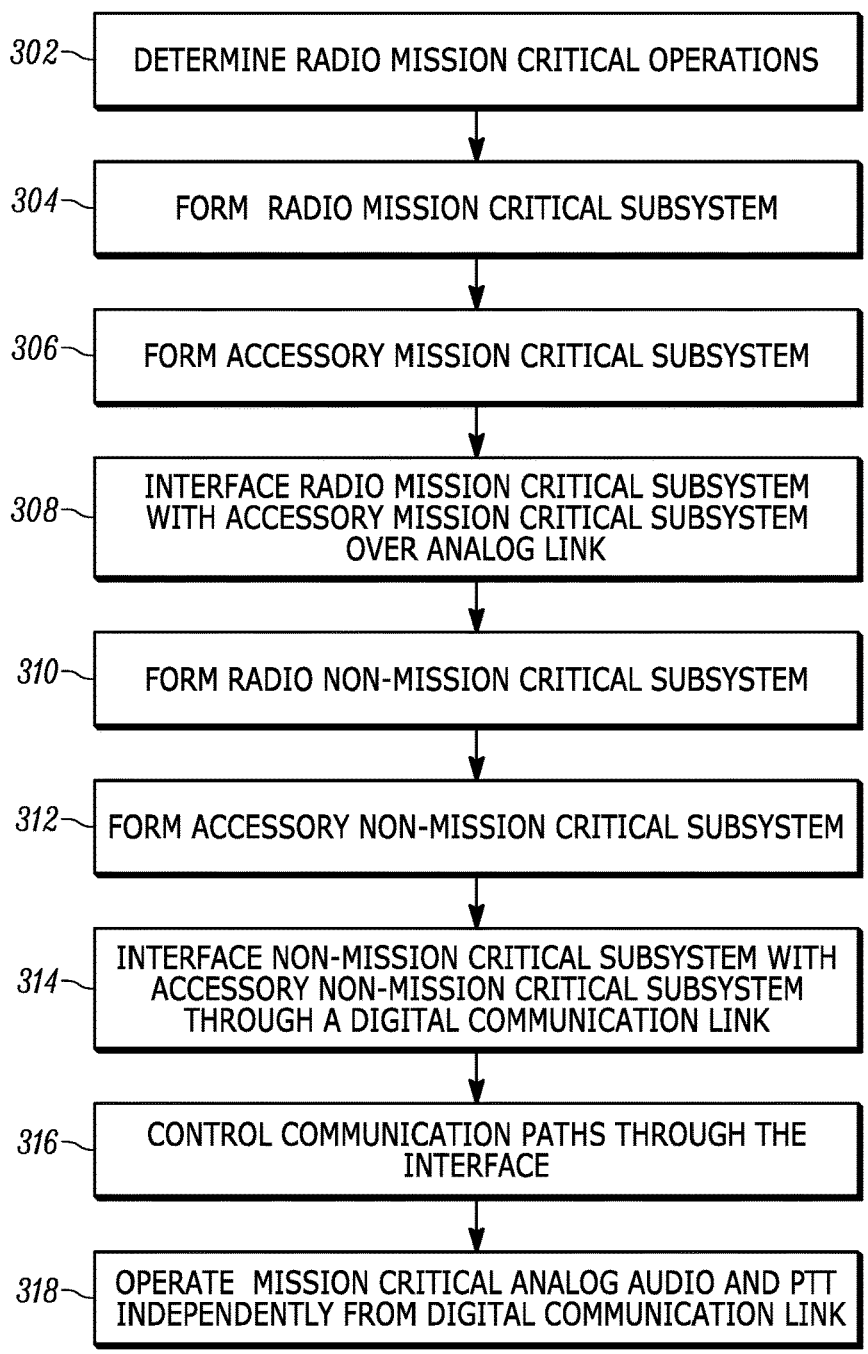
FIG. 3 is a method for providing expanded interface operation between a portable communication device and a remote accessory formed and operating in accordance with some embodiments.

FIG. 2 is a block diagram of a portable communication system 200 including portable communication device, and an expanded interface 230 interconnected with a remote accessory formed and operating in accordance with some embodiments. The portable communication device may be embodied as the portable two-way radio 102 of FIG. 1 while the remote accessory may be embodied as the remote speaker microphone (RSM) 104 of FIG. 1. Expanded interface 230 may be a USB-C interface and may use a standards-compliant USB-Type C connector. For example expanded interface may comprise the expanded interface 106 with USB-C plug 130 of FIG. 1, in accordance with some embodiments. The use of two-way radio 102 and RSM 104 is intended as an example, as other accessories having push-to-talk capability and audio functionality (microphone, speaker) may also take advantage of the interface 230. Examples of other portable accessories include but are not limited to, PTT microphone headsets, car interface kits and surveillance accessories to name a few.

Alternately, expanded interface 230 may be a USB-C interface with a proprietary connector, that is, a connector this is not mechanically compatible with USB-C. The proprietary connector may have a signal set which maps one-to-one with the USB-C specification, or the proprietary connector may have a larger signal set of which some USB-C signals are a subset. A proprietary connector will impair interoperability, but such a connector may have improved performance in hazardous environments or in environments where contaminants may clog or otherwise harm the connector.

In accordance with the embodiments, the analog audio links 212, 214 at interface 230 operates over at least a mission-critical subsystem 202 of the communication system 200; and optionally over one or more auxiliary, non mission-critical subsystems such as 252. Auxiliary subsystem 252 may also utilize the analog audio links 212, 214 at interface 230 by routing (not shown) audio from subsystem 252 to subsystem 202, allowing the accessory 104 to be used by both subsystems. In such a configuration, the mission-critical subsystem 202 is responsible for controlling the routing selection and may take control of the analog audio at interface 230 at any time for mission-critical communication. For example, communication over Wi-Fi may be accomplished using auxiliary subsystem 252 and it would be desirable for such communication to benefit from the use of accessory 104. As subsystems 202, 252 are operated independently, mission-critical subsystem 202 may still use and control analog audio even if non mission-critical subsystem 252, the more complex and less reliable subsystem, were to encounter a fault. This arrangement ensures the highest reliability for mission-critical communication.

Beginning at the radio device side, the portable radio 102 comprises a processor 206 and a radio frequency (RF) transceiver 208 for transmitting and receiving, in a two-way radio environment. In public safety operations, a narrow-band transceiver can be utilized operating over public safety frequencies. The transceiver 208 uses an antenna for transmitting and receiving signals over the air, and includes circuitry and components for RF operations, including modulation, demodulation, mixing, frequency generation, filtering, amplification, and so on. Depending on the usage application, different transceivers may be used, as long as audio functionality remains under PTT control. In accordance with the embodiments, portable radio 102 operates as a host device and further comprises a radio USB type-C power delivery controller 210. The processor 206, radio USB type-C power delivery controller 210 form a radio mission-critical subsystem (1A) of the overall communication system 200.

Moving to the accessory side, in accordance with the embodiments, the RSM 104 comprises an accessory mission-critical subsystem (1B) formed of a push to talk (PTT) switch 220, a microphone 222, a speaker 224 and audio power amplifier 230, along with the option of an emergency button 226. Again for the purposes of this application, the mission-critical functions which are to be maintained in the event of a fault condition comprise: push-to-talk (PTT) and mission-critical audio. As mentioned previously, in some embodiments, mission-critical control functions may further comprise an emergency button 226 providing an emergency alert transmission signal. The emergency button 226 is present on many but not all push-to-talk products. For example, emergency is typically found on the RSM 104, but may not be found on a PTT headset. Hence, the emergency button 226 is left as a configurable feature which may be encompassed within mission-critical functionality, if applicable and desired. The mission-critical control functions of PTT and Emergency are ported across GPIO lines of interface 230.

In the mission-critical subsystem, the PTT and emergency are brought over GPIO lines, SBU1 and SBU2 of interface 230. The interface 230 is configured (wired and controlled by radio processor 206) in such a manner as to the maintain mission-critical functionality of analog audio 212 for the RSM microphone 222 between RSM 104 and the portable radio 102 even in the event of a fault in the radio or accessory. Similarly, the interface 230 is also configured to maintain mission-critical functionality of analog audio 214 to the RSM speaker 224 between RSM 104 and the portable radio 102 even in the event of a fault in the radio or accessory. The analog audio links 212, 214 along with PTT provide a first communication path of interface 230 in FIG. 2. The interface 230 has thus been configured to have the RX ports operating as first independent communication paths between the portable radio 102 and accessory 104.

As such, the RSM 104 is able to maintain mission-critical operation using the mission-critical subsystem which provides the push-to-talk (PTT) button 220 and analog audio via microphone 222 and speaker 224 and the analog audio interface at interface 230 to processor 206. The RSM 104 further comprises an accessory USB type-C power delivery controller 217 which is shown within the mission-critical outline due to the fact that power delivery controller 217 interfaces with the radio USB type-C power delivery controller 210 on the radio side, and which are used to detect the attachment and configuration of an accessory to the portable radio 102. The configuration includes the negotiation of the mission-critical alternate mode described herein. Once the initial accessory attachment is detected, the accessory USB type-C power delivery controller 217 is not required for operating the actual mission-critical controls for the mission-critical operation mode. In accordance with some embodiments, the accessory USB type-C power delivery controller 217 may be considered part of the mission-critical subsystem 1B for the purpose of controlling another (or second) independent mission-critical subsystem.

In accordance with the embodiments, the RSM 104 further comprises a second mission-critical subsystem. The RSM's second mission-critical subsystem interfaces to the portable radio 102 through interface 230 over a configuration channel (CC) port. The control functions of the RSM 104 which operate in second mission-critical operating mode, still do not require a processor, but merely power which is provided by the accessory USB TYPE-C controller 217. For example, LEDs 240, volume up/down and other input(s) 218 may be powered by the accessory USB TYPE-C controller 217. The CC line channel configuration line interfaces and links the two power delivery devices, the radio USB TYPE-C power delivery controller 210 to accessory USB TYPE-C power delivery controller 217 to operate independently of analog audio and PTT but still operate as part of the mission-critical subsystem. The interface 230 has thus been configured to have the configuration channel (CC) port operating as a second independent communication path between the portable radio 102 and accessory 104.

The RSM 104 may contain additional functionality such as additional inputs, sensors, or even a color display. Such functionality may be valuable to the user, but is generally not categorized as "mission-critical". Accordingly, said functionality is partitioned into auxiliary subsystems 252, 254 of the radio and accessory respectively (also shown as AUXILIARY SUBSYSTEM 2A and AUXILIARY SUBSYSTEM 2B in FIG. 2). The partitioning may be further desirable because such functions may be better matched with a high-level operating system (HLOS) of an auxiliary microprocessor 250 in subsystem 252.

The portable radio 102 comprising auxiliary subsystem 252 which is a non mission-critical subsystem may, for example be an Android operating system, LTE operating system, or other smartphone operating system. This auxiliary, non mission-critical subsystem 252 is controlled by the auxiliary processor 250 and interfaced to the RSM 104 via interface 230 at ports USB D+/D− to allow similar functions to be replicated to the RSM 104. Auxiliary subsystem 252 comprises non mission-critical controls or inputs, such as display 238 controlled by the auxiliary processor 250.

Communication system 200 further supports an independently run auxiliary subsystem 254. Auxiliary subsystem 254 is also a non mission-critical subsystem having inputs such as display 228 and non mission-critical input 258 controlled by an auxiliary microprocessor 260 connected via interface 230 at ports at ports USB D+/D− to portable radio 102. Examples of the non mission-critical input 258 might include keypad entry. The USB D+/D− are digital links that are separated from the analog paths of mission-critical. The interface 230 has thus been configured to have the ports digital link ports USB D+/D− ports operating as a third independent communication path between the portable radio 102 and accessory 104.

In accordance with the embodiments, in the event of a fault in subsystems 252 and/or 254, the mission-critical subsystems 202, 204 are advantageously able to maintain analog audio and PTT, and if applicable emergency button 226. In accordance with the mission-critical operation, a first communication path at interface 230 between the mission-critical subsystem of the portable radio 102 and the mission-critical subsystem of the RSM 104 establishes mission-critical communications over assigned ports, such as assigned ports RX2−, RX2+ and RX1+, RX1− of the USB-C interface from FIG. 1B.

In a use case scenario of the embodiments, if auxiliary subsystem 252 fails in any way, or if auxiliary subsystem 254 fails in any way, the accessory 104 functionality associated with subsystem 254 may become degraded or non-functional. As previously explained, these non mission-critical auxiliary subsystems are more prone to fault conditions due to their extremely high complexity and application environments. During such a fault condition, the partitioning of the mission-critical portions of the system ensures that the mission-critical functionality of mission-critical subsystems 202, 204 are not affected by the fault condition. Hence, a user is able to maintain mission-critical communications.

In an alternate embodiment, where an application running on non mission-critical subsystem 252 is using the analog audio path in interface 230, such a fault condition would still allow mission-critical subsystem 202 to have prioritized use of interface 230. Thus, any application or function running in auxiliary subsystems 252, 254 is deemed non mission-critical.

Accordingly, the communication modes provided by the various subsystems of the embodiments operate independently and in parallel providing separation of analog audio from digital auxiliary function links. In the event of a fault condition, mission-critical operation including audio, PTT, Emergency remains functional. Thus, communications are maintained in a continuous fashion. Continuous communication and independent subsystems minimize susceptibility to hardware and software faults. Unlike former switched or bypass type approaches the continuous communication provided by the mission-critical subsystem provides improved reliability in communications.

In accordance with some embodiments, there is provided a method 300 for expanding interface operation between a portable radio and an accessory. At 302 mission-critical radio operations are determined. These mission-critical operational parameters may be determined for example, on a public safety type environment and include mission-critical audio, PTT and/or emergency.

A radio mission-critical subsystem is formed at 304 which will be used in mission-critical operation. An accessory mission-critical subsystem is formed at 306 which will also be used in critical mission operation. As previously described, mission-critical subsystem such as mission-critical audio operation without the use of a non mission-critical microprocessors or DSPs.

In accordance with the embodiments, an expanded interface enables the radio mission-critical subsystem to operate with the accessory mission-critical subsystem over an analog link at 308. A radio non mission-critical subsystem is formed at 310, and an accessory non mission-critical subsystem is formed at 312. In accordance the various embodiments, the radio non mission-critical subsystems is interfaced with the accessory non mission-critical subsystem through a digital communication link at 314. Control of communication paths between the plurality of subsystems takes place through the interface at 316, wherein mission-critical analog audio and PTT operate independently from digital communication links at 318.

The method 300 of expanding interface operation between a radio and an accessory advantageously allows for continuous communication, even in the event of an error in that mission-critical audio and PTT remain operational throughout all operations. There is no switch to turn on or off, no bypass needed, and no processing requirements needed. The subsystem simply remains operational in the event that other independently interfaced, parallel operating systems shut down.

Accordingly, the method 300 has provided for the USB-C interface to be configured by the radio microprocessor to partition operation between analog audio and digital communication links. The mission-critical subsystem and auxiliary subsystems thus formed can be independently and simultaneously controlled.

Figure 4:
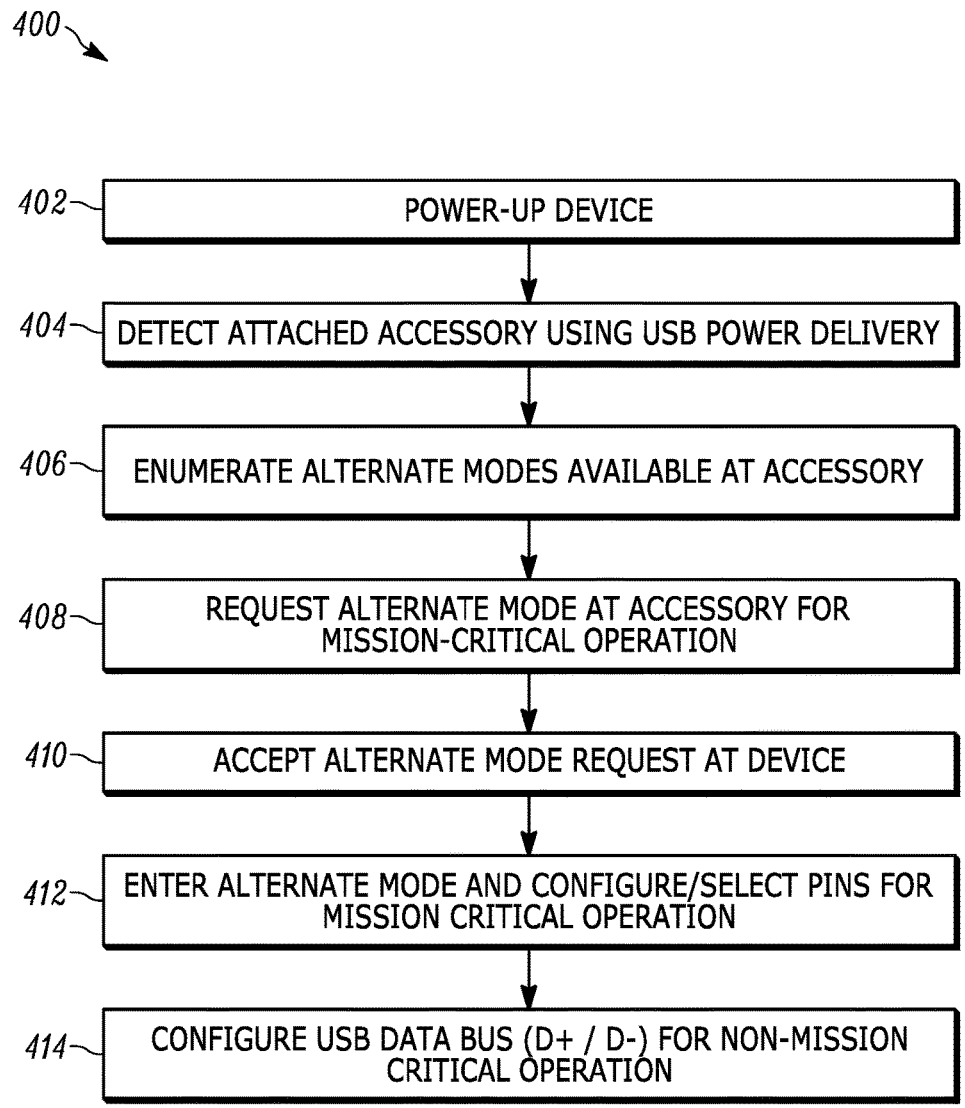
FIG. 4 is a method for operating a portable communication device and a remote accessory in accordance with some embodiments.

FIG. 4 is a method 400 for operating a portable communication device and a remote accessory in accordance with some embodiments. Method 400 begins at 402 by powering up a portable communication device formed in accordance with the embodiments previously described. The portable battery operated device is preferably a two-way radio having push-to-talk capability. The method continues at 404 by detecting an attached accessory that utilizes USB Power Delivery (USB-PD), followed by step 406 in which the accessory enumerates the available alternate modes to the portable communication device. Recognizing the attachment of this type of accessory at the device allows the device to verify the accessory as a mission-critical accessory, and verify that a compatible alternate mode is available.

Continuing to 408, the device requests the vendor-defined alternate mode for mission-critical operation, followed by the accessory accepting the alternate mode request at 410. The device enters the alternate mode and configures pin assignments, such as by selecting pins for mission-critical operation at 412. Additionally, as part of entering the alternate mode, operation of non mission-critical function are configured over USB data bus (D+/D−) for operation at 414.

Thus, mission-critical and non mission-critical are able to run independently in parallel. If an interruption or fault condition in software or hardware occurs in the auxiliary subsystems, the mission-critical functions will remain operational by operating in the mission critical mode using only the pin assignments for mission critical operation.

Some of the mission-critical inputs and outputs previously described can be configured to operate over the configuration channel (CC1, CC2) lines between the USB Power Delivery (USB-PD) controller of the accessory and the (USB-PD) controller of the device. These functions, for example status LEDs or volume control buttons, may also be deemed extremely important but there are insufficient signal lines on the interface needed to accommodate such functions. Accordingly, such functions can be operated using vendor-defined modes and messages as permitted by the USB-PD specification over the USB-PD configuration channel. Such operation is slightly more complex than the direct GPIO method used for PTT or emergency, but the implementation is well-below the complexity of full USB data and the associated software stacks running on the HLOS processor. In accordance with some embodiments, these functions are deemed as mission-critical, as they are nonetheless very reliable in terms of operation when software fault conditions or glitches occur The USB-PD method for mission-critical signals also will incur some additional latency for message transmission and decoding. Accordingly, the preferred embodiment places PTT and Emergency, where very low latency is strongly desired, directly on GPIO, SBU1 and SBU2 pins. Alternate embodiments may move the assignment of mission-critical signals as appropriate for specific operational requirements.

Accordingly, there has been provided a method and apparatus for advantageously operating a portable communication system to maintain communication even under certain failed conditions. Avoiding reliance on the USB data bus, and advantageously utilizing the more robust low speed digital, analog, and GPIO type connections the USB-Type C interface provided by the embodiments is far less susceptible to hardware faults such as ESD and contact bounce as well as various types of software faults Unlike systems which merely provided for switchover between digital and analog audio processing, the interface provided by the embodiments provides for partitioning connectivity between analog audio and digital communication links, which provides the advantage of independent and parallel operation. Unlike some past systems that merely multiplexed a display port and USB on the same connection using alternate modes, the interface of the various embodiments allows for actual splitting connectivity independent subsystems on the portable radio. Thus, the interface of the various embodiments goes beyond partitioning of a single accessory device which allows for the implementation of fail-safe operation of a mission-critical subsystem.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication system, comprising:
a portable radio having a radio microprocessor and an auxiliary microprocessor; and
a remote audio accessory; and
an interface for coupling the remote audio accessory to the portable radio, the interface further comprising USB-C being configured by the radio microprocessor to partition operation between a mission-critical subsystem and an auxiliary subsystem, where the mission-critical subsystem is simultaneously operable with the auxiliary subsystem, and where the auxiliary subsystem on the portable radio and the auxiliary subsystem on the remote audio accessory communicate using a USB D+/D− link.

2. A method for operating a communication system comprising a portable communication device and a remote audio accessory, the method comprising:
powering up the portable communication device to provide two-way radio PTT communication;
detecting an attached remote audio accessory that utilizes USB;
requesting, by the portable communication device, an alternate mode of operation for mission-critical operation from the remote audio accessory;
accepting, by the remote audio accessory, the alternate mode request;
entering the alternate mode and configuring pin assignments for mission-critical operation;
as part of entering the alternate mode, configuring, over USB data bus (D+/D−) non mission-critical operation of functions to independently operate in parallel with mission critical functions; and
operating in the alternate mode in which both mission-critical and non mission-critical functions are operating.

3. The method of claim 2, further comprising:
incurring a software fault condition at the portable communication device; and
operating in mission-critical mode using only the pin assignments for mission-critical operation.

4. A communication system, comprising:
a portable communication device having a radio microprocessor;
a remote accessory wired to the portable communication device; and
an interface for coupling the remote accessory to the portable communication device, the interface comprising a USB-C interface coupling the remote accessory to the portable communication device, the USB-C interface being configured by the portable communication device to partition operation of the interface to a plurality of independent mission-critical subsystems and auxiliary subsystems, and wherein the USB-C interface provides:
- a first communication path for controlling a mission-critical subsystem of the remote accessory, the mission-critical subsystem of the remote accessory comprising mission-critical audio and a push-to-talk (PTT) button; and
- a second communication path for controlling other mission-critical inputs over a channel configuration line interconnecting a radio USB TYPE-C power controller of the portable communication device with an accessory USB TYPE-C power controller of the remote accessory.

5. The communication system of claim 4, wherein the first communication path of the USB-C interface comprises sideband channel SBU1 /SBU2 lines configured as signal lines for a PTT button and an emergency button and analog audio lines controlled by the PTT button.

6. A communication system, comprising:
a portable communication device having a radio microprocessor;
a remote accessory wired to the portable communication device; and
an interface for coupling the remote accessory to the portable communication device, the interface comprising a USB-C interface coupling the remote accessory to the portable communication device, the USB-C interface being configured by the portable communication device to partition operation of the interface to a plurality of independent mission-critical subsystems and auxiliary subsystems,
wherein the mission-critical subsystem further comprises an emergency alert button at the remote accessory configured through the USB-C interface.

7. The communication system of claim 6, wherein the emergency alert button at the remote accessory is configured through a sideband channel (SBU1 or SBU2) of the USB-C interface.

8. The communication system of claim 4, wherein the portable communication device is a two-way radio and the remote accessory is a remote speaker microphone.

9. A communication system, comprising:
a portable communication device having a radio microprocessor;
a remote accessory wired to the portable communication device;
an interface for coupling the remote accessory to the portable communication device, the interface comprising a USB-C interface coupling the remote accessory to the portable communication device, the USB-C interface being configured by the portable communication device to partition operation of the interface to a plurality of independent mission-critical subsystems and auxiliary subsystems;
a first mission-critical communication path interfacing the mission-critical subsystem of the portable communication device and a mission-critical subsystem of the remote accessory for mission-critical audio communications; and
a second mission-critical communication path configured over configuration channel (CC) interface lines of the USB-C interface for interfacing the portable communication device and the remote accessory.

10. The communication system of claim 9, wherein the mission-critical subsystem of the remote accessory comprises at least one microphone and a push-to-talk (PTT) button.

11. The communication system of claim 4, wherein mission-critical inputs to the remote accessory are controlled by a USB TYPE-C power controller at the remote accessory which interfaces via the CC interface lines to a USB TYPE-C power controller of the portable communication device.

12. The communication system of claim 11, further comprising:
one or more auxiliary communication paths for interfacing auxiliary subsystems of the portable communication device with auxiliary subsystems of the remote accessory.

13. A communication system, comprising:
a portable communication device having a radio microprocessor;
a remote accessory wired to the portable communication device; and
an interface for coupling the remote accessory to the portable communication device, the interface comprising a USB-C interface coupling the remote accessory to the portable communication device, the USB-C interface being configured by the portable communication device to partition operation of the interface to a plurality of independent mission-critical subsystems and auxiliary subsystems, wherein the USB-C interface further comprises:
one or more universal serial bus data lines USB D+/D− for interfacing the remote accessory and the portable communication device.

* * * * *